United States Patent
Adorf et al.

(10) Patent No.: US 10,400,704 B2
(45) Date of Patent: Sep. 3, 2019

(54) INTERNAL COMBUSTION ENGINE AND METHOD FOR CONTROLLING THE OPERATION OF THE INTERNAL COMBUSTION ENGINE

(75) Inventors: Sonja Adorf, Augsburg (DE); Peter Holand, Dinkelscherben (DE); Joachim Nutto, Augsburg (DE)

(73) Assignee: MAN Energy Solutions SE, Augsburg (DE)

( * ) Notice: Subject to any disclaimer, the term of this patent is extended or adjusted under 35 U.S.C. 154(b) by 626 days.

(21) Appl. No.: 13/639,126

(22) PCT Filed: Jan. 24, 2011

(86) PCT No.: PCT/DE2011/050000
§ 371 (c)(1),
(2), (4) Date: Dec. 10, 2012

(87) PCT Pub. No.: WO2011/124218
PCT Pub. Date: Oct. 13, 2011

(65) Prior Publication Data
US 2013/0144513 A1    Jun. 6, 2013

(30) Foreign Application Priority Data
Apr. 8, 2010   (DE) .......................... 10 2010 003 736

(51) Int. Cl.
*B60K 28/16* (2006.01)
*F02D 41/34* (2006.01)
(Continued)

(52) U.S. Cl.
CPC .............. *F02D 41/34* (2013.01); *F02B 21/00* (2013.01); *F02B 29/02* (2013.01); *F02D 29/02* (2013.01); *F02D 41/0007* (2013.01); *F02D 41/401* (2013.01); *F02D 41/3836* (2013.01); *F02D 2250/31* (2013.01); *Y02T 10/144* (2013.01); *Y02T 10/146* (2013.01); *Y02T 10/44* (2013.01)

(58) Field of Classification Search
CPC ........ B60K 28/16; B60K 31/047; B60K 6/24; B60K 6/445; B60L 11/123; F02D 41/0007; F02C 6/16; F02B 37/025; F02B 33/30; F02B 33/44
USPC .......... 701/105; 123/559.1; 60/613, 617, 619
See application file for complete search history.

(56) References Cited

U.S. PATENT DOCUMENTS 5,394,954 A * 3/1995 Tashiro et al. ................ 180/178
5,553,575 A * 9/1996 Beck et al. ................ 123/198 F
(Continued)

*Primary Examiner* — Hai H Huynh
*Assistant Examiner* — Gonzalo Laguarda
(74) *Attorney, Agent, or Firm* — Cozen O'Connor

(57) ABSTRACT

Internal combustion engine and method for controlling the operation of an internal combustion engine, wherein the method comprises: determining an operating load of the internal combustion engine, controlling the operation of the internal combustion engine on the basis of a standard control map which realizes a determined propulsion power of the internal combustion engine when the operating load of the internal combustion engine is constant and, when the operating load of the internal combustion engine increases to a predetermined extent, activating at least one control characteristic for modifying the standard control map so that the propulsion power of the internal combustion engine is increased.

11 Claims, 1 Drawing Sheet

(51) Int. Cl.
*F02B 21/00* (2006.01)
*F02B 29/02* (2006.01)
*F02D 29/02* (2006.01)
*F02D 41/00* (2006.01)
*F02D 41/40* (2006.01)
F02D 41/38 (2006.01)

(56) References Cited

U.S. PATENT DOCUMENTS

| | | | |
|---|---|---|---|
| 6,039,025 A * | 3/2000 | Iwano et al. | 123/399 |
| 6,325,044 B1 * | 12/2001 | Chen et al. | 123/357 |
| 6,401,692 B1 * | 6/2002 | Grieshaber et al. | 123/456 |
| 7,685,819 B2 * | 3/2010 | Vetrovec | F02B 29/0412 123/540 |
| 7,877,996 B2 * | 2/2011 | Berger et al. | 60/598 |
| 2010/0043753 A1 * | 2/2010 | Gallagher | F02D 35/024 123/447 |
| 2010/0162686 A1 * | 7/2010 | Miyashita et al. | 60/274 |
| 2013/0090832 A1 * | 4/2013 | Bevan | F02B 37/04 701/102 |

* cited by examiner

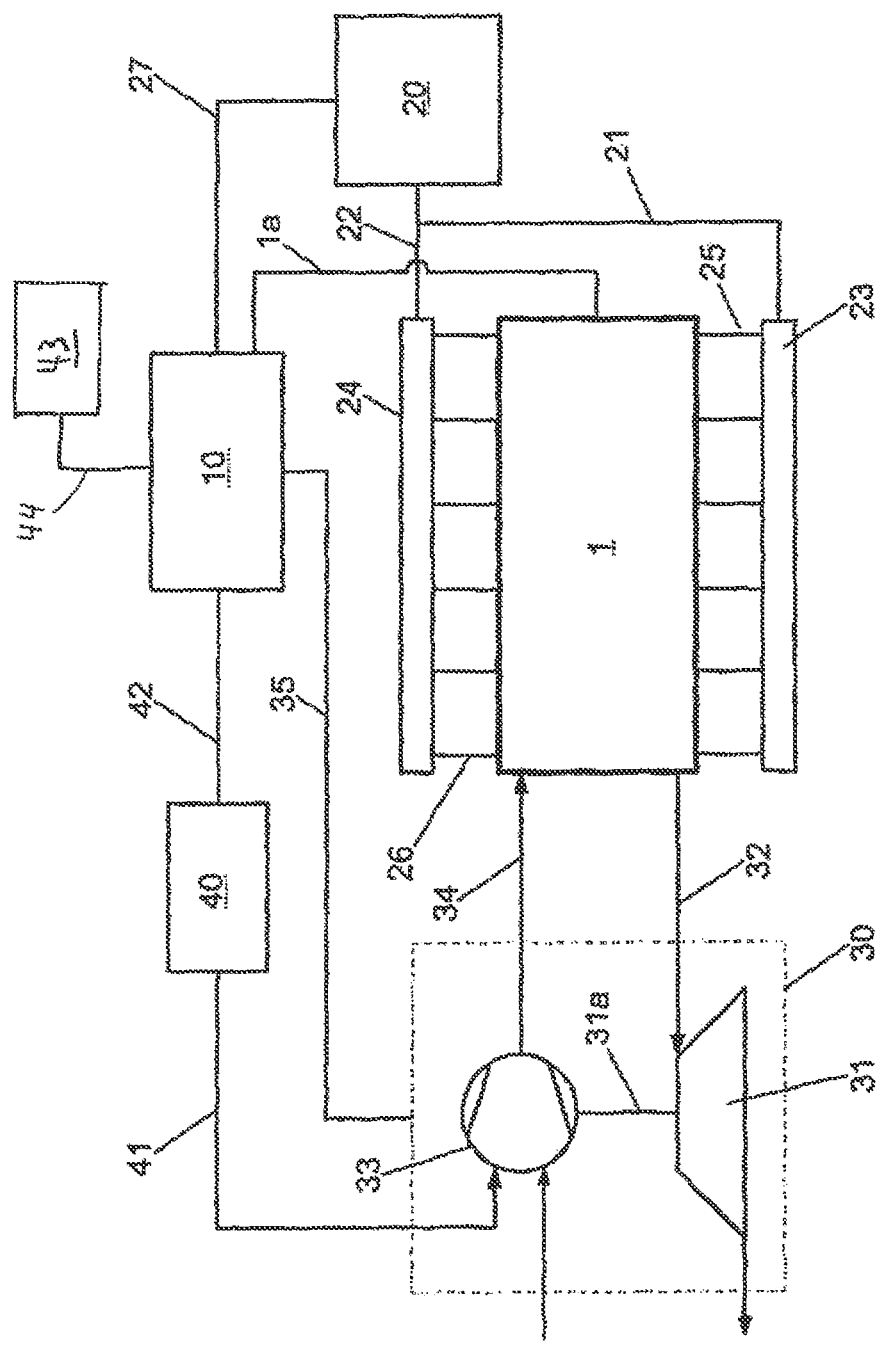

INTERNAL COMBUSTION ENGINE AND METHOD FOR CONTROLLING THE OPERATION OF THE INTERNAL COMBUSTION ENGINE

PRIORITY CLAIM

This is a U.S. national stage of application No. PCT/DE2011/050000, filed on Jan. 24, 2011. Priority is claimed on the following application(s): Country: Germany, Application No.: 10 2010 003 736.2, Filed: Apr. 8, 2010, the content of which is/are incorporated herein by reference

BACKGROUND OF THE INVENTION

1. Field of the Invention

The invention is directed to an internal combustion engine and to a method for controlling the operation of the internal combustion engine.

2. Background of the Invention

Internal combustion engines such as common rail diesel engines, for example, have for controlling the operation thereof various control maps which are optimized for a stationary operation (operation of the internal combustion engine without a sudden change in operating load or increase in operating load).

At present, in exhaust-gas turbocharged internal combustion engines a compressed-air assist system is used to increase the rotational speed of the compressor of the exhaust gas turbocharger in the event of a sudden increase in operating load. In this form of increasing the rotational speed of the compressor, which is also known as "jet assist", compressed air is blown onto the blading of the compressor impeller through nozzle-like supply air apertures. This accelerates the compressor impeller and accordingly conveys more air to the internal combustion engine, thus improving its response to a sudden increase in the operating load. An example of a compressed-air assist system or jet assist system of this kind is described on page 77 (Section 0410.02) of the project development handbook by MAN Diesel SE (headquarters in Augsburg, Germany).

However, the use of a compressed-air assist system leads to an appreciable increase in the operating costs of the internal combustion engine due to its consumption of compressed air. Further, a compressed-air assist system of this kind also requires a certain period of time for accelerating the compressor impeller in the desired manner, and a drop in rotational speed of the internal combustion engine can accordingly not be completely averted.

Thus, it is an object of the invention to provide a method by which the response of an internal combustion engine to an increase in the operating load can be improved in a simple manner. The invention has the further object of providing an internal combustion engine for performing the method according to the present invention.

SUMMARY OF THE INVENTION

According to a first aspect of the invention, a method is provided for controlling the operation of an internal combustion engine, wherein the method comprises: determining an operating load of the internal combustion engine, controlling the operation of the internal combustion engine when the operating load of the internal combustion engine is constant on the basis of a standard control map which realizes a predetermined propulsion power of the internal combustion engine and, when the operating load of the internal combustion engine increases to a predetermined extent, activating at least one control characteristic for modifying the standard control map so that the propulsion power of the internal combustion engine is increased.

By activating the at least one control characteristic, and preferably a plurality of control characteristics, for modifying the standard control map, a higher propulsion power of the internal combustion engine, e.g., a higher indicated torque, can be achieved simply, quickly and economically, and when there is a sudden increase in operating load, this in turn results in a smaller drop in rotational speed and in a smaller increase in pollutant emissions of the internal combustion engine.

According to an embodiment of the method according to the invention, the standard control map is so modified by activating the at least one control characteristic that an injection time of internal combustion engine fuel is advanced in time and/or that an injection pressure of the internal combustion engine fuel is increased, which consequently increases the ignition pressure of the internal combustion engine fuel.

Both of the above-mentioned steps are preferably carried out so that an optimal increase in the propulsion power of the internal combustion engine is achieved.

According to a further embodiment of the method according to the invention, for purposes of the advance in time of the injection time of the internal combustion engine fuel, the injection time of the internal combustion engine fuel is advanced by 2 degrees to 4 degrees with respect to a rotational angle of a crankshaft of the internal combustion engine.

According to another embodiment of the method according to the invention, for the increase in the injection pressure of the internal combustion engine fuel, the injection pressure of the internal combustion engine fuel is increased by 200 bar to 400 bar.

According to yet another embodiment of the method according to the invention, the at least one additional control characteristic is deactivated and the operation of the internal combustion engine is controlled with the unmodified standard control map as soon as the operating load of the internal combustion engine is constant for a predetermined period of time and/or as soon as a determined propulsion power of the internal combustion engine is exceeded.

According to an embodiment of the method according to the invention, for determining the operating load of the internal combustion engine, the operating load is determined as increasing to the predetermined extent: when a time-dependent increase in a fuel charge for combustion in the internal combustion engine exceeds a predetermined time-dependent charge quantity increase limit value, or when a ratio of fuel charge quantity to air quantity for combustion in the internal combustion engine exceeds a predetermined fuel-air ratio limit value, or when a time-dependent decrease in a rotational speed of the internal combustion engine exceeds a predetermined time-dependent internal combustion engine rotational speed decrease limit value, or when a time-dependent increase in the consumer output exceeds a predetermined time-dependent load increase limit value.

In other words, according to the invention, a sudden increase in operating load is detected: by means of the fuel charge increase dependent on time, or by means of a fuel charge over air quantity (e.g., charge air quantity) function dependent on time, or based on the drop in rotational speed of the internal combustion engine, or by means of the load increase dependent on time.

According to another embodiment of the method according to the invention, for the increase in the operating load of the internal combustion engine, dependent on the extent and/or duration of the increase in the operating load of the internal combustion engine, an assist system for increasing the quantity of air supplied to the internal combustion engine and/or the at least one control characteristic for modifying the standard control map are/is activated.

In other words, depending on the extent and/or duration of the sudden increase in the operating load of the internal combustion engine, either only the assist system, e.g., a compressed-air assist system, is used or only the control characteristic for modifying the standard control map is used, or both steps can be used. During a sudden increase in the operating load of the internal combustion engine, the assist system for increasing the air quantity supplied to the internal combustion engine and the control characteristic for modifying the standard control map are both preferably activated so that the drop in rotational speed of the internal combustion engine and the energy consumption (e.g., compressed air consumption) of the assist system are reduced as a result of the shorter acceleration time.

When consumption of compressed air is reduced, for example, a compressed air supply of the assist system can be dimensioned more compactly in turn so that costs can be cut additionally.

Owing to the higher indicated torque of the engine based on the steps described above, the increase in pollutant emissions, e.g., soot formation in diesel engines, can in turn be abated. This is a result particularly of the fact that when there is a sudden increase in operating load (e.g., in a ship's diesel engine or in a diesel-electric power generation system) the propulsion system responds by increasing the fuel supply to the higher power requirement and, accordingly, when there is a drop in rotational speed excess fuel in the combustion mixture leads to increased pollutant emissions like increased soot formation. Thus by increasing the induced torque of the engine an increase in pollutant emissions can be prevented to a great extent or decisively reduced.

According to a second aspect of the invention, an internal combustion engine has a control apparatus which is adapted to implement a method according to one or more or all of the above-described embodiments of the invention in any conceivable combination.

According to the invention, the control apparatus can take the form of hardware, software, firmware or a combination thereof. The control apparatus is preferably integrated in an electronic engine control apparatus. The standard control map with associated characteristics, which is optimized for stationary operation or operation at constant operating load, and the additional characteristic, preferably a plurality of additional characteristics, for modifying the standard control map are stored in the control apparatus, e.g., in an electronic storage.

According to an embodiment of the internal combustion engine according to the invention, the internal combustion engine is a large-capacity diesel engine and has a common rail fuel injection system coupled in controlled relationship with the control apparatus and an exhaust gas turbocharger for pressure charging the air quantity for combustion in the internal combustion engine.

In accordance with the invention, by large-capacity diesel engines are meant, for example, those used for propulsion of ships or in power plants for driving generators.

According to another embodiment of the internal combustion engine according to the invention, the exhaust gas turbocharger has a compressed-air assist system, wherein the compressed-air assist system is coupled in controlled relationship with the control apparatus, wherein the control apparatus is adapted to activate the compressed-air assist system when there is a determined increase in the operating load of the internal combustion engine so that an air quantity supplied by the exhaust gas turbocharger for combustion in the internal combustion engine is increased, and wherein the control apparatus is adapted dependent on the extent and/or duration of the increase in the operating load of the internal combustion engine to initiate the activation of the compressed-air assist system and/or by implementing the method according to the invention to initiate the activation of the at least one control characteristic for modifying the standard control map.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will be described in more detail in the following with reference to a preferred embodiment and the accompanying drawing in which:

FIG. 1 is a schematic view of an internal combustion engine according to an embodiment of the present invention.

DETAILED DESCRIPTION OF THE PRESENTLY PREFERRED EMBODIMENTS

The internal combustion engine 1 shown in FIG. 1 is a large-capacity diesel engine (in this case, e.g., a 12 cylinder V-type engine) for operating (propulsion and/or power generation) a ship (not shown).

The internal combustion engine 1 has a control apparatus 10, a common rail fuel injection system 20, an exhaust gas turbocharger 30 for pressure charging an air quantity provided for combustion in the internal combustion engine 1, and a compressed-air assist system 40 for rapidly increasing the air quantity supplied by the exhaust gas turbocharger 30 during a sudden increase in an operating load (operating load cut-in) of the internal combustion engine 1.

An increase of this kind in the operating load of the internal combustion engine 1 by a predetermined extent can be brought about, e.g., by an increase in thrust or increase in speed of the ship initiated from the bridge of the ship or, e.g., in a diesel-electric system, also due to sudden switching on of a relevant electrical consumer.

The common rail fuel injection system 20 has two main fuel lines 21, 22 by which two fuel rail lines 23, 24 of the common rail fuel injection system 20 are supplied with diesel fuel under high pressure (up to 1600 bar) from a fuel tank (not shown) via a fuel pump (not shown) controlled by the common rail fuel injection system 20.

Each of the fuel rail lines 23, 24 is connected to the six cylinders (not shown) of each longitudinal side of the 12-cylinder internal combustion engine 1 by six fuel supply lines 25 and 26, respectively, with controllable fuel injectors.

The internal combustion engine 1 (particularly also the fuel injectors thereof) and the common rail fuel injection system 20 thereof are coupled via control lines 1a and 27, respectively, in controlled relationship with the control apparatus 10, wherein a plurality of standard control maps for a stationary operation (constant operating load) of the internal combustion engine 1 are stored in an electronic storage (not shown) of the control apparatus 10. A predetermined propulsion power of the internal combustion engine 1, for one, is realized by means of the standard control maps.

The consumer load 43 is connected to the control apparatus 10 via a control line 44.

The exhaust gas turbocharger 30 has an exhaust gas turbine 31 which is connected to an exhaust output (not designated) of the internal combustion engine 1 via an exhaust gas line 32, and a compressor 33 which is driven by the exhaust gas turbine 31 via a connection shaft 31a and which is connected to an air input (not designated) of the internal combustion engine 1 via a charge air line 34.

The exhaust gas turbocharger 30 is coupled in controlled relationship with the control apparatus 10 via a control line 35 and is preferably likewise controlled by the standard control maps stored in the control apparatus 10, e.g., by means of adjustable guide devices.

The compressed-air assist system 40 is fluidically connected to the compressor 33 via a compressed-air line 41 so that if necessary (i.e., during an increase in operating load) compressed air can be blown onto the blading of a compressor impeller (not shown) through nozzle-shaped supply air apertures (not shown) in the compressor 33, and the compressor impeller can be accelerated in this way so that more charge air is conveyed to the internal combustion engine 1. For control of the compressed-air assist system 40, the latter is coupled with the control apparatus 10 via a control line 42.

According to the invention, the control apparatus 10 is adapted to activate the compressed-air assist system 40 when there is a determined increase in the operating load of the internal combustion engine 10 so that the quantity of charge air supplied by the exhaust gas turbocharger 30 for combustion in the internal combustion engine 1 is increased.

Further, according to the invention, a plurality of additional control characteristics are stored in the storage of the control apparatus 10. These additional control characteristics are so specified that when the operating load of the internal combustion engine 1 is increased to a predetermined extent by an increase in operating load the standard control map is so modified by activation of the additional control characteristics that the propulsion power of the internal combustion engine 1 is increased and the operating load increase is accordingly compensated, According to a method for controlling the operation of the internal combustion engine 1 according to an embodiment of the invention, the operating load of the internal combustion engine 1 is determined by means of sensors (not shown) in the control apparatus 10 continuously during operation of the internal combustion engine 1.

When the operating load of the internal combustion engine 1 is constant (stationary operation), the operation of the internal combustion engine 1 is controlled based on the standard control maps stored in the control apparatus 10.

When the operating load of the internal combustion engine 1 increases to a predetermined extent, the additional control characteristics for modifying the standard control map are activated by the control apparatus 10 so that the propulsion power of the internal combustion engine 1 is increased.

By activating the additional control characteristics, the standard control map is modified in such a way that an injection time of internal combustion engine fuel (in this case diesel fuel) is advanced in time and/or an injection pressure of the internal combustion engine fuel is increased resulting in an increase in the ignition pressure of the internal combustion engines.

In order to advance the injection time of the internal combustion engine fuel, the injection time of the internal combustion engine fuel is advanced by the control apparatus 10 preferably by 2 degrees to 4 degrees with respect to a rotational angle of a crankshaft (not shown) of the internal combustion engine 1.

For the increase in the injection pressure of the internal combustion engine fuel, the injection pressure of the internal combustion engine fuel is preferably increased by 200 bar to 400 bar.

The advance in time of the injection time and the increase in injection pressure and/or in ignition pressure can be achieved by the control apparatus 10 by means of corresponding control of the fuel injectors and fuel pump.

According to the invention, the additional control characteristics are deactivated by the control apparatus 10 and the operation of the internal combustion engine 1 is controlled with the unmodified standard control map as soon as the operating load of the internal combustion engine 1 is constant for a predetermined time period and/or a determined propulsion power of the internal combustion engine 1 is exceeded.

For determining the operating load of the internal combustion engine 1, the operating load is determined by the control apparatus 10 as increasing to the predetermined extent: when a time-dependent increase in a fuel charge for combustion in the internal combustion engine 1 exceeds a predetermined time-dependent charge quantity increase limit value, or when a ratio of fuel charge quantity to charge air quantity for combustion in the internal combustion engine 1 exceeds a predetermined fuel-air ratio limit value, or when a time-dependent increase in the consumer output exceeds a predetermined time-dependent load increase limit value, or when a time-dependent decrease in a rotational speed of the crankshaft of the internal combustion engine 1 exceeds a predetermined time-dependent internal combustion engine rotational speed decrease limit value.

According to an embodiment of the invention, for the increase in the operating load of the internal combustion engine 1, depending on the extent and/or duration of the increase in the operating load of the internal combustion engine 1, the compressed-air assist system 40 and/or the additional control characteristics for modifying the standard control map are/is activated by the control apparatus 10.

In this case, the control apparatus 10 is adapted dependent on the extent and/or duration of the increase in the operating load of the internal combustion engine 1 to initiate the activation of the compressed-air assist system 40 and/or by implementing the method according to the invention to initiate the activation of the additional control characteristics for modifying the standard control map.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method of controlling the operation of a system including an internal combustion engine and an exhaust gas turbocharger, the exhaust gas turbocharger having compressor that supplies charge air, from at least a first air source, to the internal combustion engine, and an exhaust gas turbine that drives the compressor, the operation of the internal combustion engine being controlled, when the operating load of the internal combustion engine is constant, on the basis of a standard control map which realizes a determined propulsion power of the internal combustion engine by use of at least one stored standard control characteristic, the method comprising:
   determining an operating load of the internal combustion engine;
   when the determined operating load of the internal combustion engine increases to a predetermined extent:
   (a) activating a plurality of stored additional control characteristics that modify the standard control map so that the propulsion power of the internal combustion engine is increased, the plurality of stored additional control characteristics modifying the standard control map such that: (i) an injection time of internal combustion engine fuel is advanced in time, and (ii) an injection pressure of the internal combustion engine fuel is increased, and
   (b) blowing a second additional air source, comprising compressed air from a compressed-air assist system, via a compressed-air line, into the compressor of the exhaust gas turbocharger by the compressed-air assist system, the compressed-air assist system supplying the compressed air from the second additional air source to the compressor, the compressed-air system being controlled so that a quantity of charge air supplied by the exhaust gas turbocharger for combustion in the internal combustion engine is increased by the second additional air source being supplied to the compressor in addition to the first air source,
   wherein upon the increase in the operating load of the internal combustion engine, the compressed-air assist system is used simultaneously with the modifying of the standard control map effected by activation of the plurality of stored additional control characteristics.

2. The method according to claim 1, wherein the plurality of stored additional control characteristics are deactivated and the operation of the internal combustion engine is controlled with the unmodified standard control map as soon as at least one of the operating load of the internal combustion engine is constant for a predetermined period of time and as soon as a determined propulsion power of the internal combustion engine is exceeded.

3. The method according to claim 1, wherein for determining the operating load of the internal combustion engine, the operating load is determined as increasing to the predetermined extent:
   when a time-dependent increase in a fuel charge for combustion in the internal combustion engine exceeds a predetermined time-dependent charge quantity increase limit value, or
   when a ratio of fuel charge quantity to air quantity for combustion in the internal combustion engine exceeds a predetermined fuel-air ratio limit value, or
   when a time-dependent increase in a consumer output exceeds a predetermined time-dependent load increase limit value, or
   when a time-dependent decrease in a rotational speed of the internal combustion engine exceeds a predetermined time-dependent internal combustion engine rotational speed decrease limit value.

4. A system including the internal combustion engine comprising a control apparatus constructed to implement the method according to claim 1.

5. The system according to claim 4, wherein the internal combustion engine is a large-capacity diesel engine comprising a common rail fuel injection system coupled in controlled relationship with the control apparatus and the exhaust gas turbocharger for pressure charging an air quantity for combustion in the internal combustion engine.

6. The system according to claim 5, further comprising the compressed-air assist system, wherein said compressed-air assist system is coupled in controlled relationship with the control apparatus, wherein the control apparatus is adapted to activate said compressed-air assist system when there is a predetermined increase in the operating load of the internal combustion engine so that an air quantity supplied by the exhaust gas turbocharger for combustion in the internal combustion engine is increased, and wherein the control apparatus is adapted dependent on at least one of the extent and duration of the increase in the operating load of the internal combustion engine to initiate the activation of the compressed-air assist system and initiate the activation of the at least one control characteristic for modifying the standard control map.

7. A system including the internal combustion engine comprising a control apparatus constructed to implement the method according to claim 2.

8. A system including the internal combustion engine comprising a control apparatus constructed to implement the method according to claim 3.

9. The method according to claim 1, wherein for the advance in time of the injection time of the internal combustion engine fuel, the injection time of the internal combustion engine fuel is advanced by 2 degrees to 4 degrees with respect to a rotational angle of a crankshaft of the internal combustion engine.

10. The method according to claim 1, wherein for the increase in the injection pressure of the internal combustion engine fuel, the injection pressure of the internal combustion engine fuel is increased by 200 bar to 400 bar.

11. The method according to claim 9, wherein for the increase in the injection pressure of the internal combustion engine fuel, the injection pressure of the internal combustion engine fuel is increased by 200 bar to 400 bar.

* * * * *